Sept. 12, 1967            A. NEVULIS            3,340,897

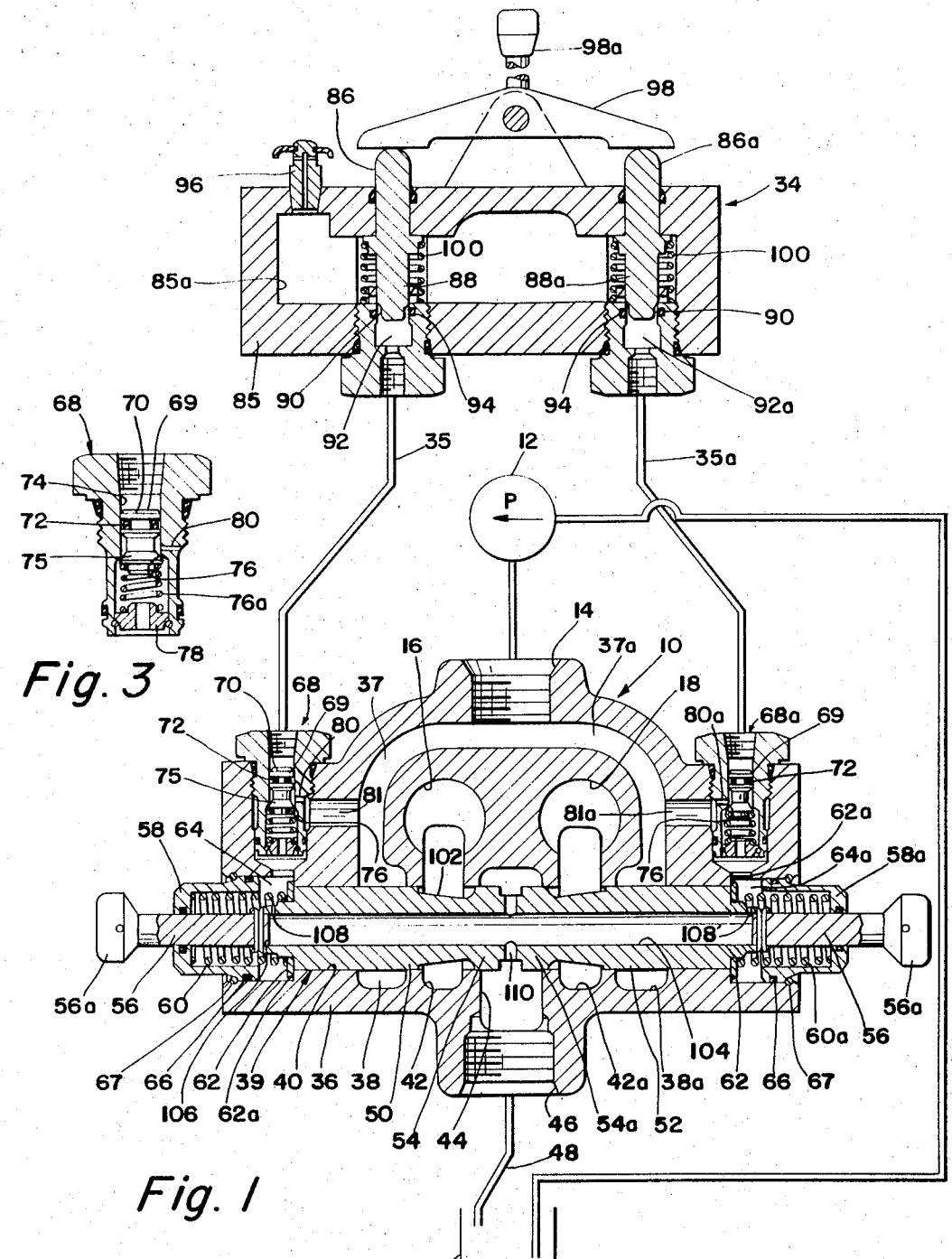

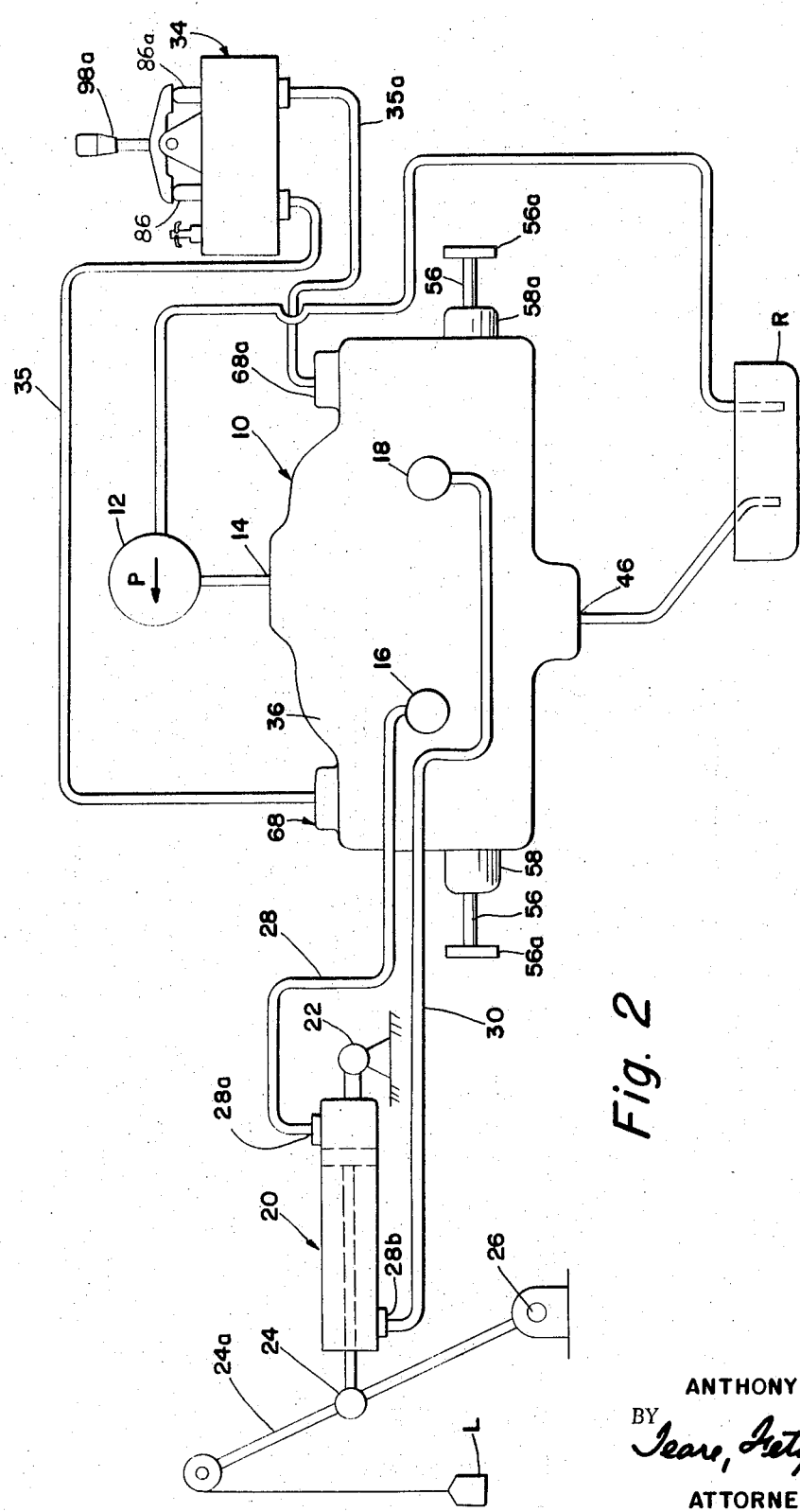

FLUID CONTROL MECHANISM

Filed May 7, 1965                         3 Sheets-Sheet 3

INVENTOR.
ANTHONY NEVULIS
BY
Teare, Fetzer & Teare
ATTORNEYS

United States Patent Office 3,340,897
Patented Sept. 12, 1967

1

3,340,897
FLUID CONTROL MECHANISM
Anthony Nevulis, Wickliffe, Ohio, assignor to The Ohio
Brass Company, Mansfield, Ohio, a corporation of New
Jersey
Filed May 7, 1965, Ser. No. 454,110
21 Claims. (Cl. 137—625.6)

This invention relates in general to fluid powered systems, and more particularly to fluid control mechanism for use in a fluid powered system, and which mechanism may be remotely controlled.

The present arrangement may be used for instance in a machinery system which may be actuated by fluid powered motor units, such as for instance fluid powered reciprocal type motor units, and wherein the machinery operator must perform the required control function from a position distant from the mandatory or desirable location of a main control valve for the motor unit or units, or from the machinery set-up itself.

Remotely operated control valves are known in the art for controlling the direction, the amount, and the rate of flow of pressurized actuating fluid used in fluid powered systems. Electrical, mechanical, pneumatic and hydraulic remote control arrangements are known and are used for obtaining remote control of valves.

However, all of the known arrangements have various shortcomings. For instance, electrical remote control arrangements require convenient sources of electrical power and are generally of the non-proportional type, or in other words are either on or off, with no intermediate on position. The mechanical arrangements are generally limited in flexibility and are usually unduly expensive. The pneumatic arrangements require a pneumatic power source, and sometimes involve considerable time delay in operation. The hydraulic remote control arrangements are usually highly susceptible to temperature-viscosity changes, therefore causing too much time delay, and being unstable and variable in their operation.

The present invention provides a remotely controlled proportional control arrangement utilizing a force displacement type control that will translate an input control signal into proportional fluid flow and pressure, to a power actuator. The remote control is relatively fast responding and substantially nonsusceptible to temperature-viscosity changes. Accordingly, it can be arranged with relatively greater distances between the pilot actuator and the fluid powered actuating mechanism, such as a main control for a fluid actuated mechanism.

Accordingly, an object of the invention is to provide a novel fluid control system for operating mechanism.

Another object of the invention is to provide a novel fluid control system including a remote control arrangement, which will translate an input control signal into proportional fluid flow and pressure, to a power actuator.

Another object of the invention is to provide a novel fluid control system including a remotely disposed pilot actuator, a converting or amplifying mechanism for receiving a pressure signal from the pilot actuator and converting it into a proportional pressure signal at a comparatively large fluid flow, and a fluid actuator means for receiving the fluid flow from the converting mechanism and utilizing it to provide a mechanical displacement of, for instance, the fluid control element of a directional control valve.

2

A further object of the invention is to provide a novel pilot actuator for use in the above discussed system.

A further object of the invention is to provide a novel converting mechanism or fluid amplifier for use in the above discussed system.

A still further object of the invention is to provide a novel control valve including an amplifying means, for controlling the direction of actuation of an associated reciprocal fluid powered motor unit, and which control valve is adapted to be controlled by a remotely disposed fluid pressure actuator or operator, providing for proportional control of the direction of actuation of the motor unit from a point remote from the control valve by a substantially temperature insensitive fluid pressure means.

A still further object of the invention is to provide a control valve comprising a valve body having a bore extending therethrough, with an axially movable control spool positioned in the bore and being adapted to be actuated by fluid pressure selectively applied to the ends of the spool, and with the control valve having a plurality of valve means forming fluid power amplifiers for selectively communicating the ends of the spool with the source of pressurized fluid, and with said valve means normally being closed and preventing actuation of the spool by the pressurized actuating fluid from said source, but with said valve means being adapted for connection to a remotely disposed fluid pressure actuator, for proportionately varying with minimum flow a selected one of valve means, and thereby actuating the said one valve means to cause uneven proportional fluid pressure loading of one end of the spool of the control valve, thereby resulting in axial actuation of the latter, and thus directionally and proportionately controlling a flow of actuating working fluid through the valve.

Other objects and advantages of the invention will be apparent from the following description taken in conjunction with the accompanying drawings wherein:

FIG. 1 is a somewhat diagrammatic, sectional view of a main control valve constructed in accordance with the invention, and as coupled by fluid pressure transmission lines to a remote fluid pressure actuator, for pilot control of the control valve.

FIG. 2 is a diagrammatic illustration of a possible system embodying the control mechanism of FIG. 1.

FIG. 3 is an enlarged sectional view of one of the valves used in the main control valve of FIG. 1 for amplifying the control signal from the remotely disposed fluid pressure actuator into a high power proportional control signal.

Figure 6:
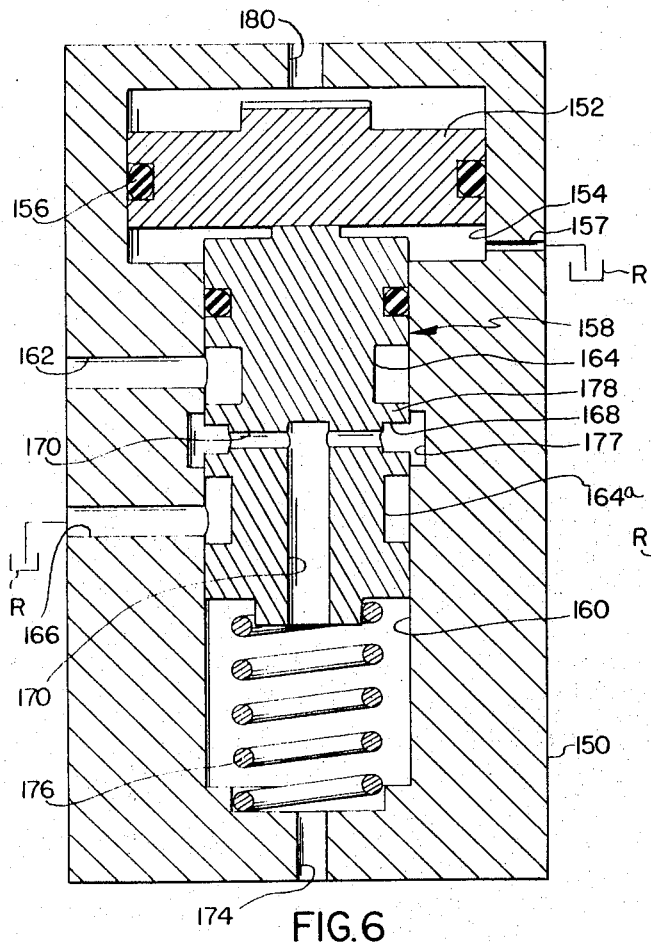
FIG. 6 is a generally diagrammatic, sectional view of a fluid power amplifier valve which will give a superior response without parasitic flow losses, at high rates of amplification.

Referring now again to the drawings, there is shown a closed center, directional control valve member 10, which is adapted for remote control and which may be connected to a conventional pump 12, which may be of the variable volume type, such as a conventional piston pump, for furnishing a flow of pressurized working fluid to the inlet port 14 of the control valve 10. Valve 10 may also embody distributing ports 16 and 18, which serve as entry or exit ports to or from the motor unit 20 (FIG. 2) depending on what direction the pressurized fluid is flowing to and from the motor unit.

The motor unit 20 may be of the double acting, reciprocal type shown, and may be pivotally attached as at 22 to a support, and pivotally attached as at 24 to a member, such as for instance a boom 24a, which in turn may be pivotally attached as at 26 to a support. The motor unit 20 as illustrated, is adapted for actuating the boom, and thus moving the boom and associated load L which may be suspended from the boom.

Distributing port 16 of the main control valve 10 may be connected by flexible transmission line 28 to port 28a of the motor unit, while distributing port 18 of the main control valve 10 may be connected by flexible fluid transmission line 30 to port 28b of the motor unit 20.

A pilot actuator or operator 34 which represents a relatively low power control signal generating means is provided for remotely controlling the actuation of the main control valve 10, as will be hereinafter dsecribed. Pilot actuator 34 may be connected by fluid lines 35, 35a to the main control valve 10.

Referring now to FIG. 1, aforementioned entry port 14 in the body 36 of the valve mechanism 10, opens into passageways 37, 37a, which in turn lead to chambers 38, 38a in the valve body. The control spool 39 of the valve 10 is movably axially in a bore or passageway 40 extending completely through the valve body. Also disposed in the valve body are chambers 42, 42a, and chamber 44, all of which are communicated with one another, as well as with aforementioned chambers 38, 38a, by means of the passageway 40.

Valve distributing port 16 communicates with chamber 42 and valve distributing port 18 communicates with chamber 42a generally as shown, while chamber 44 communicates with exit port 46, which in turn is connected as by means of fluid transmission line 48 with reservoir R.

In the neutral or centrally disposed position of the control spool 39, land portion 50 on the spool prevents communication between valve chambers 38 and 42, while land portion 52 on the spool prevents communication between chamber 38a and 42a. Moreover, in said central position of the spool, land portion 54 on the spool prevents communication between chamber 42 and chamber 44, while land portion 54a on the spool prevents communication between chamber 42a and chamber 44. Thus it will be seen that in the neutral position of the spool, the working fluid being supplied by pump 12 into passageways 37, 37a and chambers 38, 38a, can not flow into chambers 42, 42a, and thus the motor unit 20 is cut off from such working fluid.

As aforementioned, the pump may be of the variable volume output type including an associated sensing mechanism, well known in the art, for sensing the pressure at entry port 14, and adjusting the output of the pump accordingly. As an example, the pressure at entry point 14 may selected to be in the order of 2000 p.s.i so that when the pressure builds up to such figure, the pump automatically cuts down or reduces its output, until the pressure at entry port 14 decreases below such predetermined pressure figure, at which time the sensing mechanism will automatically reactivate the pump to initiate increased application of pressurized fluid to the entry port 14 once again.

Each end of the control spool 39 may have a stem 56 attached thereto and projecting outwardly from the exterior of the valve 10, with each such stem portion preferably embodying a knob 56a thereon, for manual actuation of the control spool. However, such mechanism may be omitted for strictly fluid actuation of the valve.

Coacting between each end of the control spool 39 and an associated hollow cap member 58, 58a may be a respective compression spring 60, 60a providing a precompression rate of say, for instance, 50 pounds, which springs operate to normally maintain the spool 39 in its central or neutral position. As can be seen each spring may abut against a pressure member or washer 62 which coacts with a confronting shoulder 62a on the valve body, for limiting the expansion of the associated spring.

Each cap member 58, 58a partially defines a corresponding chamber 64, 64a, representing fluid responsive actuating means at each end of the control spool 39, for a purpose to be hereinafter described. The cap members 58, 58a are disposed in sealed relationship with the confronting surfaces of the chambers 64, 64a, as by means of sealing means 66, and with such cap members being preferably detachably held in position as by snap rings 67.

Disposed generally adjacent each end of the valve mechanism 10 is a respective converting or power metering mechanism 68, 68a in the form of a valve. Each of such valve mechanisms 68, 68a may comprise a movable poppet 69, which includes a piston portion 70 having sealing means 72 associated therewith, for sealing the piston portion 70 with respect to the confronting surface of the passageway 74 in which the poppet member 69 is adapted to reciprocate. Each poppet member 69 also includes a valve seat portion 75 which is adapted for seating engagement with an associated seat 76 on the valve mechanism. A compression spring member 76a coacts between the valve member 69 and an apertured abutment 78 on the valve mechanism, for urging the poppet member 69 upwardly (as shown in FIG. 3 of the drawings) and thus urging portion 75 into sealing engagement with seat 76. Each valve mechanism 68, 68a has a respective orifice or port 80, 80a extending through the housing wall thereof, and the valve body 36 of the main control valve has passageways 81, 81a therethrough communicating a respective one of metering orifices 80, 80a with the corresponding passageway 37, 37a in the valve body 36. Thus, the poppet member 69 intermediate the piston portion 70 and the seat portion 75 is exposed to the fluid pressure in passageways 37, 37a. However, since the areas at the piston portion 70 and at the seat portion 75 exposed to the fluid pressure in passageways, 37, 37a of the valve are equal (in other words the area at sealing means 72 equals the area at the engagement of seat portion 75 with seat 76) and since the associated spring 76a holds the seat portion 75 in engagement with the associated seat 76 with a certain force, say for instance five pounds at the precompressed rate of the spring, the valve member 69 does not move but remains in its closed position.

The aforementioned actuator 34 may comprise a reservoir body 85 defining a chamber 85a, which is adapted to receive fluid therein, such as hydraulic oil, and with there being provided a pair, in the embodiment illustrated, of spaced poppet-like piston valves 86, 86a. Each of the valves 86, 86a may include a spring loaded reciprocal plunger member or portion 88, 88a, with the leading end of each plunger portion being preferably tapered or beveled as at 90, for ready movement into respective chamber 92, 92a.

A resilient sealing element 94 is preferably provided adjacent the upper end of each of the chambers 92, 92a, for sliding contact with the associated plunger, to insure sealing between the respective plunger and the associated chamber 92, 92a. The reservoir chamber 85a is vented to the atmosphere, as for instance by means of the apertured plug member 96.

Pivotally mounted on the actuator body 85 and coacting by means of the rocker 98 with the valve members 86, 86a, may be a lever 98a, which in the embodiment illustrated is adapted for manual operation by the operator, and as will be hereinafter described in greater detail. Each of the chambers 92, 92a of the remote actuator 34 is connected by means of a respective one of the aforementioned fluid transmission lines 35, 35a to a respective one of the power metering mechanisms 68, 68a in the main valve 10, and as shown. Thus each of such lines 35, 35a communicates with the respective passageway 74 in the amplifying mechanisms for the purpose of converting the signal from the pilot actuator into a proportional pressure signal to thus actuate the respective poppet valve member 69 and cause a comparatively large, proportional fluid flow, as will be hereinafter described in greater detail.

Operation of the system may be as follows:

As aforementioned pressurized working fluid from the pump 12 flows through the entry port 14 of main valve 10 into passageways 37, 37a, and into coaction with the poppet valve members 69 of metering mechanisms 68, 68a, via the orifices 80, 80a, and for instance at a pressure of approximately 2000 p.s.i. However, since the control spool member 39 of the valve is in neutral position and thus closing off the distributing ports 16, 18 from communication with such working fluid pressure, the pressure as it builds up in passageways 37, 37a, may actuate a conventional sensing mechanism on conventional pump 12, and automatically reduce or cut off the supply pressure unless and until the pressure falls below a predetermined value (e.g. 2000 p.s.i.) at which time the pump may automatically commence furnishing further pressurized fluid to entry port 14 of the valve.

Now when the operator desires to actuate the motor unit 20, and say for instance that he desired to extend the motor unit so as to lower the load L from its position illustrated in FIG. 2, the pivotal lever 98a of the remote pilot actuator 34 may be swung to the right (with reference to FIG. 2) from the position shown, thereby depressing the plunger valve 86a by means of the rocker 98 and against the resistance to compression of the associated spring 100 of the valve. As the plunger 88a enters the corresponding chamber 92a in the valve body 85, this closes off the reservoir chamber 85a from chamber 92a and causes compression of the fluid filling transmission line 35a, thereby applying an increased pressure in passageway 74 against piston portion 70 of the poppet valve 69. When the resistance to compression of the associated spring 76a of poppet 69 is overcome, poppet member 69 will move downwardly (with reference to FIG. 1) thereby unseating portion 75 from coaction with its seat 76. This unseating of poppet 69 of valve mechanism 68a permits pressurized fluid in the passageway 37a and connecting passageway 81a, to flow via the orifice 80a past open valve 69, through the apertured abutment portion 78 and into the fluid responsive actuating chamber 64a, thus increasing the fluid pressure in chamber 64a.

When the pre-compression of spring 60 at the opposite end of the spool 39 is overcome, the increased pressure in chamber 64a will cause axial movement of the spool 39 in a direction toward the left (as viewed in FIG. 1). Movement of the spool 39 sufficiently axially toward the left will open distributing port 16 of the valve to the working fluid pressure in passageway 37 and chamber 38 due to the grooved portion 102 in the spool, thereby applying fluid pressure to motor port 28a via fluid transmission line 28, and causing outward movement of the associated piston and piston rod of the motor unit. Such axial movement of spool 39 also opens distributing port 18 to chamber 44 and thus to reservoir, permitting the fluid ahead of the piston in motor unit 20 to exhaust via motor port 28b and line 30 to reservoir.

It will be seen, of course, that chamber 64 in valve body 36 is still sealed from communication with the fluid pressure in passageway 37, passageway 81 and orifice 80 by closed poppet mechanism 68 and therefore the spool is provided with an axial bore or passageway 104 therein, sealed at the ends of the spool as at 106, but communicating as by means of a relatively small orifice 108 with the chamber 64. Passageway 104 communicates as by means of transverse bore or passageway 110 with the exit port 46, line 48 and thence to the reservoir R. Thus, as the spool moves left into chamber 64, the fluid in such chamber may bleed through orifice 108 into passageway 104 and thence to reservoir via exit port 46.

When the pressure in chamber 64a becomes sufficiently great due to the supply from pump 12, the pressure reacting upon the poppet 69 of poppet mechanism 68a, will move the poppet 69 to closed condition, thereby cutting off valve actuating chamber 64a from the working pressure in passages 37a, 81a and orifice 80a. However, as soon as the pressure in chamber 64a falls sufficiently below the pressure being exerted on the piston end of the poppet by the pressure due to the actuator plunger 86a, then the poppet 69 will open and permit fluid pressure to once again flow from passages 37a, 81a and orifice 80a into chamber 64a, past the open poppet 69. Thus the poppet member 69 modulates between open and closed positions to maintain the desired pressure in the chamber 64a, and thereby maintain the position of the spool in the desired control position. More or less pressure exerted by the plunger 86a on the fluid in line 35a will of course proportionately vary the assumed control position of the spool 39.

Pivotal movement of the lever 98a in the opposite pivotal direction (i.e. toward the left as viewed in FIG. 1) will cause actuation of the poppet valve 68 in a similar manner as aforedescribed in connection with valve 68a, and shifting movement of the spool 39 toward the right as viewed in FIG. 1. Axial shifting movement of the spool toward the right, opens distributing port 18 to the working pressure in passage 37a and chamber 38a and thereby applies pressurized fluid via line 30 to motor port 28b, causing retraction of the piston of the motor unit, while communicating the distributing port 16 of the valve 10 with chamber 44 and thus exit port 46 and reservoir R. Orifice 108′ in the spool communicates chamber 64a with the interior passageway 104 of the spool and thence to reservoir, in a similar manner as that aforediscussed in connection with orifice 108.

The system as illustrated and described is extremely compact for this type of remote control, and the actuator 34 can be placed a considerable distance away from the main control valve 10, say for instance, in the magnitude of 100 or 200 feet. Due to the fact that relatively small quantities of fluid or oil are transferred in the pilot lines 35, 35a, the device is comparatively temperature insensitive, thus changes in fluid-viscosity and temperature have very little effect.

Figure 4:
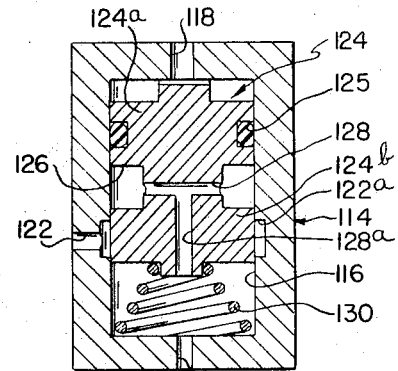
FIG. 4 is a generally diagrammatic, sectional view of a modified form of valve of the general type of FIG. 3, but utilizing a spool instead of the poppet of the FIG. 3 type for controlling the flow of pressurized fluid.

Referring now to FIG. 4, there is shown a modification of a converting or metering valve for receiving the fluid pressure signal from a pilot actuator such as actuator 34, and converting it into a proportional pressure signal at a comparatively large fluid flow. Such an amplifying valve mechanism may comprise a body portion 114 defining a preferably cylindrical cavity 116 therein, with such valve body having a port 118 adapted for connection to one of the fluid transmission lines 35, 35a (FIG. 1) from the actuator mechanism, and an outlet port 120 for communicating the cavity or chamber 116 with pressure actuating means such as the actuating chamber 64 or 64a of the control valve 10. A port 122 is provided communicating with circumferential recess 122a in the body 114, for communicating the chamber 116 with a source of pressurized fluid, and for instance if the FIG. 4 metering valve was utilized in the fluid system of FIG. 1, port 122 could communicate passageway 37a and chamber 52 in the control valve 10 with the chamber 116 in amplifying valve 114, and via the passageway 81a in the control valve 10 upon predetermined actuation of the amplifying valve.

A spool 124 is disposed in the chamber 116 for axial movement therein, and with the spool 124 comprising a piston portion 124a disposed in sealing relation, as by means of O-ring 125, with the interior walls of chamber 116, and a valve portion 124b. Spool 124 may be provided with a circumferential groove 126 which is communicated via transverse passageway 128, and vertical passageway 128a, with the exit port 120 of the valve. A spring 130 may coact with the spool 124 to urge the valve portion 124b of the spool into closing relation to the inlet port 122, as shown in FIG. 4. The metering valve illustrated in FIG. 4 has a one to one pressure ratio, and operates in a similar manner of that aforedescribed in connection with valve mechanisms 68, 68a. In other words, upon application of a pressure signal from pilot actuator 34, the spool 124 is adapted to move downwardly, as viewed in FIG. 4, to communicate port 122 with recess 126 and associated passageway means 128, 128a, thereby permitting pressurized fluid to flow out exit port 120 to cause actuation of some pressure actuated mechanism, such as for instance the spool 39 of the valve 10 of the FIG. 1 system.

Figure 5:
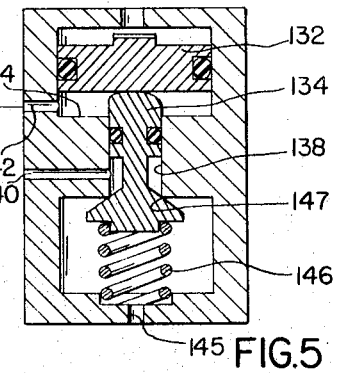
FIG. 5 is a generally diagrammatic, sectional view somewhat similar to that of FIG. 3 but wherein not only the fluid flow will be amplified, but also the pressure signal from the pilot actuator.

Referring now to FIG. 5, there is shown a power amplifier valve which will not only amplify fluid flow, but also the pressure signal from an actuator, such as the pilot actuator 34. The pressure amplification will be proportional to the areas of the upper free floating piston member 132 and the effective area of the poppet 134 of the valve structure. The poppet member 134 is movable axially in preferably cylindrical passageway 138, which is connected by port 140 to a source of pressurized fluid in a similar manner to the valve arrangement of FIG. 4, and which also includes a port 142, communicating the piston chamber 144 with the reservoir R of the fluid system. A spring member 146 operates to urge the poppet 134 into sealing engagement with the seat 147 to prevent communication between inlet pressure port 140 and exit port 145. Such an amplifying valve mechanism will not only conserve manual effort on the part of the operator, since it will amplify the pressure signal, but will also permit large force amplifications in applications of the system when the pilot actuator 34 is used to operate remotely controlled fluid actuated mechanisms without the use of an intermediate control valve such as shown in FIG. 1, but for instance, used directly to control a speed changing mechanism of for instance a variable speed belt drive, or the like.

The metering valves illustrated in FIGS. 3, 4 and 5 are based on the principle of continuous flow of pressurized fluid from a source into contact with the operating mechanism of the valve. Even with the pilot control actuator 34 stationary, volume flow of pressurized fluid is continuously passed through the inlet port or orifice 80 of the FIG. 3 valve arrangement, the port 122 of the FIG. 4 valve arrangement, and the port 140 of the FIG. 5 arrangement. This not only provides a constant parasitic loss in the system, but limits the response of the control upon actuation of the pilot actuator 34. In order to limit such substantially constant power loss in the system, it is generally desirable to reduce the size of the ports or orifices 80, 80a, 122, or 140, to an absolute minimum. This reduction in size of the orifice then limits the response of the mechanism during the reverse stroke, or in other words, as the poppet or spool moves to a closed position.

Accordingly, in those applications where the amplifying valve is used to operate directly relatively heavy machine elements, as opposed to the use of some intermediate mechanism such as the main control valve 10 illustrated in FIG. 1, the use of an amplifier valve of the type illustrated in FIG. 6 may be highly desirable. This type of power amplifier valve will give a much superior response without parasitic flow losses at high rates of amplification. Such a valve may comprise a valve body 150 having an enlarged piston 152 disposed in piston chamber 154 for axial movement therein, and having sealing means in the form of, for instance, O-ring 156, for sealing the piston 152 with respect to the side surfaces of preferably cylindrical chamber 154. Chamber 154 may be vented by port 157.

Disposed below free floating piston 152 may be a spool member 158 axially movable in passageway or chamber 160 in the valve body 150. The valve body may embody a passageway or port 162 therein for communicating the chamber 160 with the exterior of the valve, and adapted for connection to a source of pressurized fluid, and with the valve spool 158 being provided with axially spaced circumferential recesses 164 and 164a. The passageway or port 166 in the valve body may communicate the chamber 160 and circumferential recess 164a in the spool 158 with the reservoir R of the system upon predetermined axial movement of the spool. Disposed intermediate recesses 164, 164a is a circumferential recess 168 in the spool which is communicated via passages 170 and 170a with exit port 174 of the amplifying valve. A spring 176 may be provided for urging the spool to a neutral position, wherein the passage 162 communicates with recess 164 but is out of communication with circumferential recess 177 in the valve body, due to the land 178 on the spool. In the position of the spool 158 shown in FIG. 6, the exit port 174 is sealed from recess 164 which contains the high pressure fluid, and recess 164a is connected to the low pressure reservoir R of the fluid system by port 166.

Assuming application of a pressure signal to port 180 of the valve, this signal causes downward movement of the piston 152 and associated downward movement of the spool 158 of the valve, thus connecting recess 164 with recess 177 in the valve, and thereby permitting flow of pressurized fluid from the source, and such as for instance a pump, through passages 170, 170a, and out exit port 174, whereupon the pressurized fluid may be utilized to actuate some mechanism.

Conversely, movement of the spool 158 upwardly from the position shown in FIG. 6 will connect the recess 164a to recess 177 in the valve body, and therefore effectively connect the portion of the chamber 160 disposed below the valve spool with the low pressure reservoir R. The valve spool will automatically seek a condition of floating equilibrium of forces, and any increase in the signal pressure from the pilot actuator will automatically increase the level of force tending to move the piston 152 and associated spool 158 downwardly, and thus connecting the exit port 174 with the source of high pressure fluid as aforedescribed. Pressure in the chamber 160 below the spool will start rising until the force therein becomes sufficiently large to move the control spool 158 and associated piston back to the neutral position shown in FIG. 6. Conversely, a drop in the pressure applied by the movable piston 152 will unbalance the equilibrium of forces acting on the spool, resulting in connection of reservoir R to the portion of chamber 160 disposed below the spool 158. Thus, the pressure in such chamber will start dropping until the condition of equilibrium is again reached and the signal pressure from the pilot actuator and the corresponding force applied by the piston 152 return the control spool 158 to neutral position.

Therefore, the fluid amplifier valve shown in FIG. 6 will automatically maintain a substantially fixed ratio between inlet signal pressure at port 180 and outlet pressure at port 174. The magnitude of the pressure ratio will be equal to the area ratio of the free floating piston 152 and the effective cross-sectional area of the control spool 158. The spring 176 is utilized to move the spool 158 in absence of control or signal pressure by the pilot actuated control, to a position where the portion of chamber 160 disposed below the spool may be connected to the low pressure reservoir R. This valve amplifier will therefore amplify the pressure signal to any desired power level, while maintaining the output pressure at port 174 proportional at all times to the input pressure at port 180. Under a condition of very fast change in the pressure level of the control signal from the pilot actuator 34, the spool 158 will move away from neutral position to provide large areas of flow connecting the source of fluid pressure and the chamber 160, or connecting the chamber 160 with the reservoir R. Thus, there is provided a very high gain amplifier valve for permitting instantaneous large flows to automatically maintain the proportionality of the amplified pressure signal from the pilot actuator. This type of amplifier valve may therefore be used in the direct operation of heavy mechanical components, without the use of an intermediate directional control valve.

Figure 7:
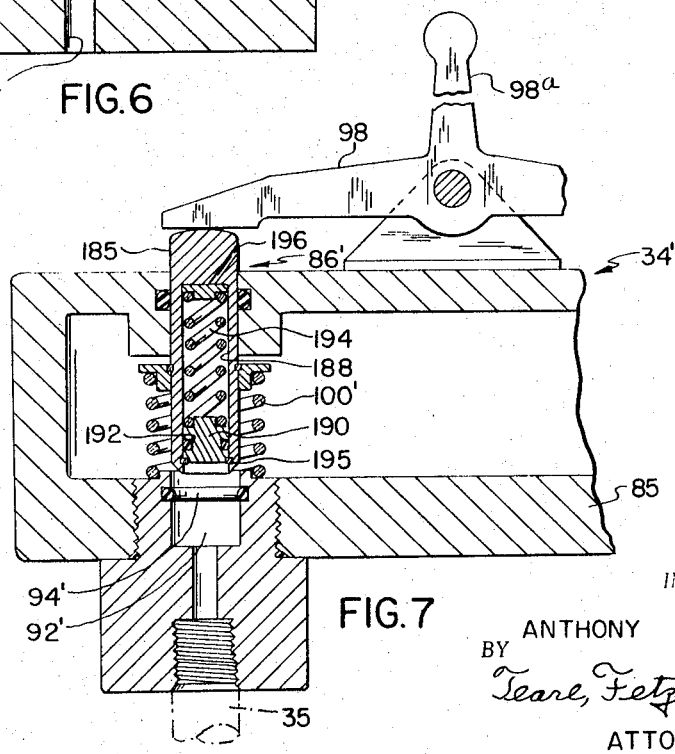
FIG. 7 is a fragmentary, sectional view of a modified form of pilot actuator compared to that of FIG. 1, and one which permits selection of effective spring constant of the signal transmitting system, and therefore, compensation of the variation in spring constant of the signal transmitting lines which connect the remotely located pilot actuator to the power amplifying valves of FIGS. 3 to 6.

Referring now to FIG. 7, there is illustrated a modified form of pilot actuator for use in the system of the invention. In use of this system, the fluid transmitting lines 35, 35a connecting the pilot actuator to the amplifying valve mechanism may take the form of plastic tubing, such as nylon tubing. Such tubing has a relatively low spring constant, resulting in substantial deflection with a rise in the magnitude of the pressure signal. This characteristic may produce both parasitic losses as well as beneficial results. The parasitic effect is to increase the flow requirement of the control signal due to change in volume capacity of the pressure signal transmitting lines, and thus inducing higher losses in the control lines, and therefore necessitating a control signal at a higher power level. The beneficial effect of the low spring constant of, for instance, nylon control lines, lies in the higher system stability and the proportional "feel" of the control to the operator.

When the transmitting lines (i.e. lines 35, 35a) are formed of more rigid material having a high spring constant, such as for instance, heavy walled steel tubing, the control signal would be generated without any appreciable movement of the control lever of the pilot actuator, thus eliminating the so called "feel" of the control system.

Furthermore, a very small change in the position of the pilot control plunger (e.g. 86 or 86a) would result in a very high change in the control pressure levels within the signal transmitting lines, thus possibly providing a somewhat unstable control.

The FIG. 7 embodiment permits selection of an effective spring constant of the signal producing and transmitting system, and therefore compensates for variation in the spring constant of the signal transmitting lines. The plunger 185 of the piston valve 86' of the pilot control 34' is provided with a bore 188 guiding a sealing plunger 190 which may be equipped with some suitable sealing means such as O-ring 192. Spring means 194 coacts between the plunger 190 and the upper end of the chamber or bore 188 in the piston 185. Snap ring 195 may limit downward movement of plunger 190. The space enclosing the spring 194 may be vented to atmosphere as at 196.

Once the plunger 185 advances downwardly sufficiently to trap fluid in the space 92', the rise in pressure in space 92' in respect to movement of the control handle 98a of the pilot actuator will depend on the spring rate of the transmitting line 35, the bulk modulus of the hydraulic fluid used in the actuator, and the spring rate of spring 194. The pressure generated in space 92' and reacting on the cross-sectional area of the sealing plunger 190, will move it in the bore 188 against the resistance to compression of the spring 194. In this way, not only the spring rate of the system can be regulated to obtain high control stability, but at the same time the relationship between the magnitude of the pressure signal and the displacement of the control handle 98a can be adjusted.

The compensating mechanism 190, 194 shown in FIG. 7 as located interiorly of the plunger 185 is for convenience only, and a similar spring loaded sealing plunger arrangement could be located in any suitable position in the system, such as for instance in the chamber 92' or elsewhere in the signal transmitting line. It is preferable however, to locate the compensating mechanism 190, 194 as close to the control handle 98a as possible, to minimize power losses in the system.

From the foregoing description and accompanying drawings it will be seen that the invention provides a novel remote control valving mechanism and associated system for readily controlling the movement of an associated fluid powered mechanism and a system that is relatively simple and maintenance free in construction, and one that is extremely desirable from an economic standpoint. The invention also provides a system that is substantially temperature-viscosity insensitive.

The terms and expressions which have been used are used as terms of description, and not of limitation, and there is no intention in the use of such terms and expressions, of excluding any equivalents of any of the features shown or described, or portions thereof, and it is recognized that various modifications are possible within the scope of the invention claimed.

I claim:
1. In a remote controlled pressurized fluid system comprising a main control valve having a body, an inlet port in said body adapted for connection to a source of pressurized fluid, an exit port in said body adapted for connection to a reservoir for fluid, a pair of distributing ports in said body, axially movable control means in said body for controlling the flow of pressurized fluid from said inlet to said distributing ports, and from the latter to reservoir, said control means in one position thereof blocking said inlet port from said distributing ports, fluid responsive actuating chamber means in said body adjacent the ends of said control means for actuating said control means to move the latter to a position wherein said inlet port is communicated with a selected one of said distributing ports, poppet-like metering valve means disposed intermediate said inlet port and said fluid responsive actuating means for controlling the application of pressurized fluid from said inlet port to said fluid responsive actuating means, and signal generating means for actuating said poppet-like metering valve means proportionately to a pressure signal from said signal generating means to cause proportional axial movement of said control means and proportional application of pressurized fluid from said inlet port to a selected one of said distributing ports.

2. In a remote control fluid pressure system comprising, pilot actuator means for producing a relatively low fluid pressure signal, a control valve means disposed remote from said pilot actuator means adapted to receive therein and distribute therefrom a fluid working pressure, poppet-like metering valve means operably connected to said control valve means for actuation in response to said pressure signal from said pilot actuator means, fluid line means connecting said pilot actuator means to said poppet-like metering valve means, and fluid passageway means connecting the fluid working pressure in said control valve means with said poppet-like metering valve means, whereby actuation of said poppet-like metering valve means causes selective metering of said fluid working pressure from said passageway means.

3. In a system in accordance with claim 2, wherein said control valve means includes fluid actuating chamber means communicating with said poppet-like metering valve means for translating the metered fluid working pressure into proportional mechanical movement.

4. In a system in accordance with claim 3, wherein said control valve means includes an inlet port and a distributing port, and spool valve means movable axially therein and communicating with said fluid actuating chamber means for controlling the flow of fluid working pressure from said inlet port to said distributing port in response to actuation of said pilot actuator means.

5. In a system in accordance with claim 2, wherein said control valve means includes an inlet port and a distributing port, a spool valve member disposed for axial movement in said control valve means, fluid actuating chamber means disposed adjacent at least one end of said spool valve member and communicating with said poppet-like metering valve means, said spool valve member adapted to control the flow of fluid working pressure from said inlet port to said distributing port in proportion to the metering of said fluid working pressure through said poppet-like metering valve means into said fluid actuating chamber means.

6. In a system in accordance with claim 5, wherein said control valve means includes an exit port, said spool valve member having a cylindrical, hollow construction closed at both ends thereof, said spool valve member having an inlet orifice and an outlet bore communicating with said exit port for discharging fluid working pressure from said control valve means through said spool valve member and out through said exit port.

7. In a system in accordance with claim 2, wherein said pilot actuator means includes a chamber and a plunger valve means movable in said chamber for automatically controlling the pressure signal transmitted to said poppet-like metering valve means.

8. In a system in accordance with claim 2, wherein said control valve means includes an inlet port and a distributing port, a spool valve member axially movable in said control valve means for controlling the flow of fluid working pressure from said inlet port to said distributing port, fluid chamber means disposed adjacent one end of said spool valve member and communicating with said poppet-like metering valve means, and said poppet-like metering valve means including a metering orifice communicating with said pasageway means for metering fluid working pressure through said poppet-like metering valve means into said fluid chamber means for actuating said spool valve member in response to said pressure signal.

9. In a system in accordance with claim 2, wherein said poppet-like metering valve means includes a body having an axial passageway therein and adapted to receive said pressure signal, a valve member having a piston portion adapted to be actuated by said pressure signal, a valve seat means adapted for seating engagement with said piston portion, and orifice means in said body communicating said passageway with said passageway means for metering said fluid working pressure through said passageway upon actuation of said piston portion by said pressure signal.

10. In a system in acordance with claim 9, including resilient means urging said valve member into seating engagement with said valve seat means.

11. In a system in accordance with claim 2, wherein said control valve means includes an inlet port and a pair of distributing ports, spool valve means movable in said control valve means, said poppet-like metering valve means including a pair of poppet valve members disposed on opposed sides of said inlet port, a fluid chamber means communicating one of said poppet valve members with one end of said spool valve means and another fluid chamber means communicating the other end of said spool valve means with the other poppet valve member for moving said spool valve means in one direction to communicate said inlet port with a respective one of said distributing ports upon movement of said pilot actuator means in one direction and for moving the spool valve means in the opposite direction for communicating said inlet port with the other distributing port upon movement of said pilot actuator means in the opposite direction.

12. A control valve for use in a fluid pressure system of the type to be remotely controlled by a relatively low pressure signal comprising, a body having an inlet port adapted for connection to a source of fluid working pressure and a pair of distributing ports, spool valve means movable in said body for controlling the flow of fluid working pressure from said inlet port to a selective one of said distributing ports, poppet-like metering valve means operably connected to said body, passageway means communicating said inlet port with said poppet-like metering valve means, and fluid actuating chamber means communicating said poppet-like metering valve means with said spool valve means for actuating said spool valve means by said fluid working pressure in response to a relatively low pressure signal generated remote from said control valve.

13. A control valve in accordance with claim 12, wherein said poppet-like metering valve means includes a body having a passageway therethrough, orifice means in said body communicating said passageway with said passageway means, a valve seat circumscribing said passageway, a valve member movable in said passageway, resilient means urging said valve member into engagement with said valve seat, and said valve member including fluid pressure actuated means for moving said valve member off said valve seat proportionately to said pressure signal.

14. A control valve in accordance with claim 13, wherein said valve member is axially movable in said passageway and is exposed to fluid working pressure from said inlet port via said passageway means and said orifice means, and said passageway communicating with said fluid actuating chamber means.

15. A control valve in accordance with claim 12, wherein said control valve body has an exit port, said spool valve means having a cavity therein communicating with said exit port and orifice inlet means communicating between said cavity and said fluid actuating chamber means for discharging fluid working pressure through said cavity to said exit port.

16. A poppet-like fluid metering valve mechanism comprising, a body having a passageway therethrough, a valve seat circumscribing said passageway, a poppet movable in said passageway and including a valve portion adapted for sealing engagement with said valve seat and a piston portion connected to said valve portion by a reduced size section, said piston portion being adapted for reciprocal movement in said passageway to cause engagement and disengagement of said valve portion with said valve seat, resilient means urging said poppet in a direction to cause engagement of said piston portion with said valve seat, said body portion having an orifice therethrough communicating with said poppet intermediate said valve and piston portions, port means for applying pressurized fluid to said piston portion.

17. A poppet-like fluid metering mechanism in accordance with claim 16, wherein the transverse cross-sectional area of said piston portion is substantially equal to the area at said valve seat.

18. A poppet-like fluid metering valve mechanism in accordance with claim 16, wherein said body includes an exit port, and means operative to automatically maintain a fixed ratio between the signal pressure and the outlet pressure at said exit port.

19. A relatively low power signal generating mechanism for use in a remote control fluid power system comprising, a housing adapted for receiving fluid therein, a fluid pressure chamber communicating with said housing, a plunger valve mounted on said housing and adapted to be received in said chamber for increasing the fluid pressure therein, line means for communicating said chamber to a remotely located pressure signal receiving means, and pivotal means for selectively actuating said plunger valve.

20. A signal generating mechanism in accordance with claim 19, wherein said pivotal means includes a rocker member pivotally mounted on said housing and adapted for engagement with said plunger valve for moving the same into said chamber, and a sealing means mounted in said chamber for sealing engagement with said plunger valve.

21. A signal generating mechanism in accordance with claim 19, wherein said plunger valve includes an axially extending bore therein, a sealing member mounted for movement in said bore, and resilient means in said bore for urging said sealing member axially in said bore against the pressure in said chamber.

References Cited

UNITED STATES PATENTS

| | | | |
|---|---|---|---|
| 2,839,264 | 6/1958 | Trubert | 251—57 |
| 2,946,196 | 7/1960 | Myers | 60—54.6 X |
| 2,981,237 | 4/1961 | Gratzmuller | 137—625.6 |
| 2,981,287 | 4/1961 | Caslow | 137—625.64 |
| 2,997,851 | 8/1961 | Trubert | 251—57 X |
| 3,228,422 | 1/1966 | Bade | 137—625.6 |

FOREIGN PATENTS 625,468  9/1961  Italy.

M. CARY NELSON, *Primary Examiner.*

HENRY T. KLINSIEK, *Examiner.*